United States Patent
Mueller et al.

(10) Patent No.: US 10,534,617 B2
(45) Date of Patent: Jan. 14, 2020

(54) BACKING UP VIRTUAL MACHINE OPERATING SYSTEM DATA ON SEQUENTIAL-ACCESS DATA STORAGE SYSTEMS

(71) Applicant: International Business Machines Corporation, Armonk, NY (US)

(72) Inventors: Christian Mueller, Dichtelbach (DE); Dominic Mueller-Wicke, Weilburg (DE); Eirini Petraki, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 15/208,871

(22) Filed: Jul. 13, 2016

(65) Prior Publication Data
US 2018/0018109 A1    Jan. 18, 2018

(51) Int. Cl.
| G06F 9/00 | (2006.01) |
| G06F 3/00 | (2006.01) |
| G06F 11/00 | (2006.01) |
| G06F 9/4401 | (2018.01) |
| G06F 9/455 | (2018.01) |
| G06F 11/14 | (2006.01) |
| G06F 3/06 | (2006.01) |
| G06F 11/20 | (2006.01) |

(52) U.S. Cl.
CPC ............ *G06F 9/4401* (2013.01); *G06F 3/065* (2013.01); *G06F 3/0677* (2013.01); *G06F 3/0682* (2013.01); *G06F 9/45558* (2013.01); *G06F 11/1456* (2013.01); *G06F 3/0625* (2013.01); *G06F 11/1402* (2013.01); *G06F 11/2056* (2013.01); *G06F 2009/45562* (2013.01)

(58) Field of Classification Search
None
See application file for complete search history.

(56) References Cited

U.S. PATENT DOCUMENTS

| 6,442,604 | B2 * | 8/2002 | Romine ............. | H04N 7/17336 348/E5.008 |
| 6,542,975 | B1 * | 4/2003 | Evers .................. | G06F 11/1458 711/112 |
| 6,804,690 | B1 * | 10/2004 | Dysert ................ | G06F 11/1458 |
| 8,315,983 | B1 | 11/2012 | Sumant et al. | |
| 2010/0162047 | A1 * | 6/2010 | Haley ................. | G06F 11/3688 714/37 |

(Continued)

*Primary Examiner* — Reginald G Bragdon
*Assistant Examiner* — Michael L Westbrook
(74) *Attorney, Agent, or Firm* — Bryan D. Wells (57) ABSTRACT

Backing up virtual machine operating system data on sequential-access data storage systems is provided. A virtual machine boots into an operating system using operating system data that is provided to the virtual machine from a random access storage unit. The random access storage unit stores the operating system data as a first plurality of blocks. The operating system data is recorded in a sequential order as it is provided to the virtual machine. The operative system data is recorded in a record file. Sequential boot data is recorded on a sequential backup system based, at least in part, on the record file. The sequential boot data is a copy of the operating system data that represent the operating system as a second plurality of blocks based, at least in part, on the sequential order of the operating system data provided to the virtual machine.

20 Claims, 3 Drawing Sheets

(56) References Cited

U.S. PATENT DOCUMENTS

| | | | |
|---|---|---|---|
| 2011/0038238 A1* | 2/2011 | Fujiwara | G06F 9/4406 369/30.07 |
| 2012/0117367 A1* | 5/2012 | Lu | G06F 9/4401 713/2 |
| 2014/0250281 A1 | 9/2014 | Rao et al. | |

* cited by examiner

BACKING UP VIRTUAL MACHINE OPERATING SYSTEM DATA ON SEQUENTIAL-ACCESS DATA STORAGE SYSTEMS

TECHNICAL FIELD

The present invention relates generally to the field of computer virtualization and, more particularly, to backing up virtual machine operating system data on sequential-access data storage systems.

BACKGROUND

Virtual machines can be hosted by hypervisors, which provide a virtual operating platform. Virtual machines may load or boot a guest operating system, which runs on the virtual operating platform. In large data centers, virtual machines can be booted on a hypervisor on the fly or as needed. As the virtual machine is booted data from a virtual file system can be provided by the hypervisor. The data used for booting the virtual machine can also be provided via a network connection; in this case the network can provide the data for booting the virtual machine without storing it on the hypervisor or a virtual disk volume local to the hypervisor.

SUMMARY

According to one embodiment of the present invention, a method for backing up virtual machine operating system data on sequential-access data storage systems is provided. The method includes: booting on a host machine, by one or more computer processors, at least one virtual machine running on a hypervisor into an operating system using operating system data, wherein the operating system data is provided to the at least one virtual machine from a random access storage unit of a storage system that is communicatively connected to the host machine and a sequential access backup system, and wherein the random access storage unit stores the operating system data as a first plurality of blocks; recording in a sequential order, by one or more computer processors, the operating system data provided to the at least one virtual machine as the operating system is booted into, wherein the operating system data is recorded in a record file; and based, at least in part, on the record file, recording on the sequential access backup system, by one or more computer processors, sequential boot data, wherein the sequential boot data is a copy of the operating system data that represents the operating system data as a second plurality of blocks based, at least in part, on the sequential order of the operating system data provided to the at least one virtual machine.

According to another embodiment of the present invention, a computer program product for backing up virtual machine operating system data on sequential-access data storage systems is provided. The computer program product comprises a computer readable storage medium and program instructions stored on the computer readable storage medium. The program instructions include: program instructions to boot, on a host machine, at least one virtual machine running on a hypervisor into an operating system using operating system data, wherein the operating system data is provided to the at least one virtual machine from a random access storage unit of a storage system that is communicatively connected to the host machine and a sequential access backup system, and wherein the random access storage unit stores the operating system data as a first plurality of blocks; program instructions to record, in a sequential order, the operating system data provided to the at least one virtual machine as the operating system is booted into, wherein the operating system data is recorded in a record file; and program instructions to record on the sequential access backup system, based, at least in part, on the record file, sequential boot data, wherein the sequential boot data is a copy of the operating system data that represents the operating system data as a second plurality of blocks based, at least in part, on the sequential order of the operating system data provided to the at least one virtual machine.

According to another embodiment of the present invention, a computer system for backing up virtual machine operating system data on sequential-access data storage systems is provided. The computer system includes one or more computer processors, one or more computer readable storage media, and program instructions stored on the computer readable storage media for execution by at least one of the one or more processors. The program instructions include: program instructions to boot, on a host machine, at least one virtual machine running on a hypervisor into an operating system using operating system data, wherein the operating system data is provided to the at least one virtual machine from a random access storage unit of a storage system that is communicatively connected to the host machine and a sequential access backup system, and wherein the random access storage unit stores the operating system data as a first plurality of blocks; program instructions to record, in a sequential order, the operating system data provided to the at least one virtual machine as the operating system is booted into, wherein the operating system data is recorded in a record file; and program instructions to record on the sequential access backup system, based, at least in part, on the record file, sequential boot data, wherein the sequential boot data is a copy of the operating system data that represents the operating system data as a second plurality of blocks based, at least in part, on the sequential order of the operating system data provided to the at least one virtual machine.

DETAILED DESCRIPTION

Modern computer hardware can provide extensive computing power that can't be efficiently used by a single operating system. Companies therefore advantageously virtualize computer and storage resources to share existing hardware resources between many virtualized host operating systems. The goal of this approach is to utilize the existing computer and storage hardware resources as efficiently as possible. The software used to virtualize and share the existing compute and storage resources is called a hypervisor. In general, a hypervisor is used to provide the virtualized hardware to multiple operating systems running on the same physical hardware. Operating systems running in a virtualized environment are called guest or virtual machines and share the hardware resources provided by one hypervisor. The shared hardware resources comprise mainly of the four components: disk, memory, processor, and network.

Virtualization and the resulting significant growth of systems and data confronts system administrators with new challenging situations in terms of data protection. For example, some backup and restore methods use hypervisor functions to perform backups from outside the virtual systems. This allows centralizing the data protection approach for many virtual systems. As used herein, backing-up of a virtual system means to read the full system data from byte 0 to byte N and send it from the backup client to a backup server. The backup server can store the data on different storage media types like disk or tape in the same order the data was sent from the backup client to the backup server.

Embodiments of the present inventions recognize that, after the backup of a virtual system has finished, administrators may want to verify that the backup was successful. To verify the backup, the virtual system is booted based on the data that is stored in the backup server. The boot operation of a system requires access to the data in sequences that depend on the operating system type. In general, however, the sequence of data accessed during the boot operation significantly differs from the sequence of the data that was sent from the backup client to the backup server and stored on the backup media. In other words, boot operations are random access processes as opposed to sequential processes. Accordingly, random access media types, like hard disk drives, are generally used to store this kind of system data because sequential access media don't allow random access to the data and the operating system will generally fail to boot because of the latency incurred while attempting to access the required data. Embodiments of the present invention recognize that sequential access media types, like tape, generally can't be used to store this kind of operating system data in this context. While it is advantageous to use tape media for storing backup data as opposed to disk media (e.g., tape has a lower per terra byte price, tape doesn't consume electricity like spinning disks, and tape doesn't require cooling), tape media cannot, in general, be used for such backup data due to this problem.

Embodiments of the present invention provide a system of two or more compute-storage nodes in which a first compute-storage node hosts a hypervisor used to virtualize the underlying hardware, the hypervisor hosting one or more virtual machines, and in which a second compute storage node hosts a backup client whereby the backup client is connected to a backup server. In such embodiments, the backup client is configured to backup and restore the virtual machines comprising functions of the hypervisor (function is called "offhost backup") and to use the backup data stored on the backup server to boot the virtual machine (the used operating system) without moving data to the hypervisor (function is called "instant access").

Embodiments of the present invention further provide "instant access" to a virtual machine where backup data resides on sequential access media types like tape. For example, some embodiments provide monitoring that is used to track access sequences to the data at the time of the operating system boot and the tracked information is used to order and cluster the data on the sequential access media. The ordered and clustered data can permit the operating system boot by using data stored on sequential access media like tape. More specifically, embodiments of the present invention provide a hypervisor with an ability to track changed data blocks that is expanded by the ability to track read access to data blocks. Additionally, various embodiments of the present invention provide a method to track and monitor virtual machine access statistics to data blocks at the time of the operating system boot. Furthermore, some embodiments provide for a method to order and cluster data on sequential access media types like tape to allow efficient access to the data at the time it is read for an operating system boot.

Figure 1:
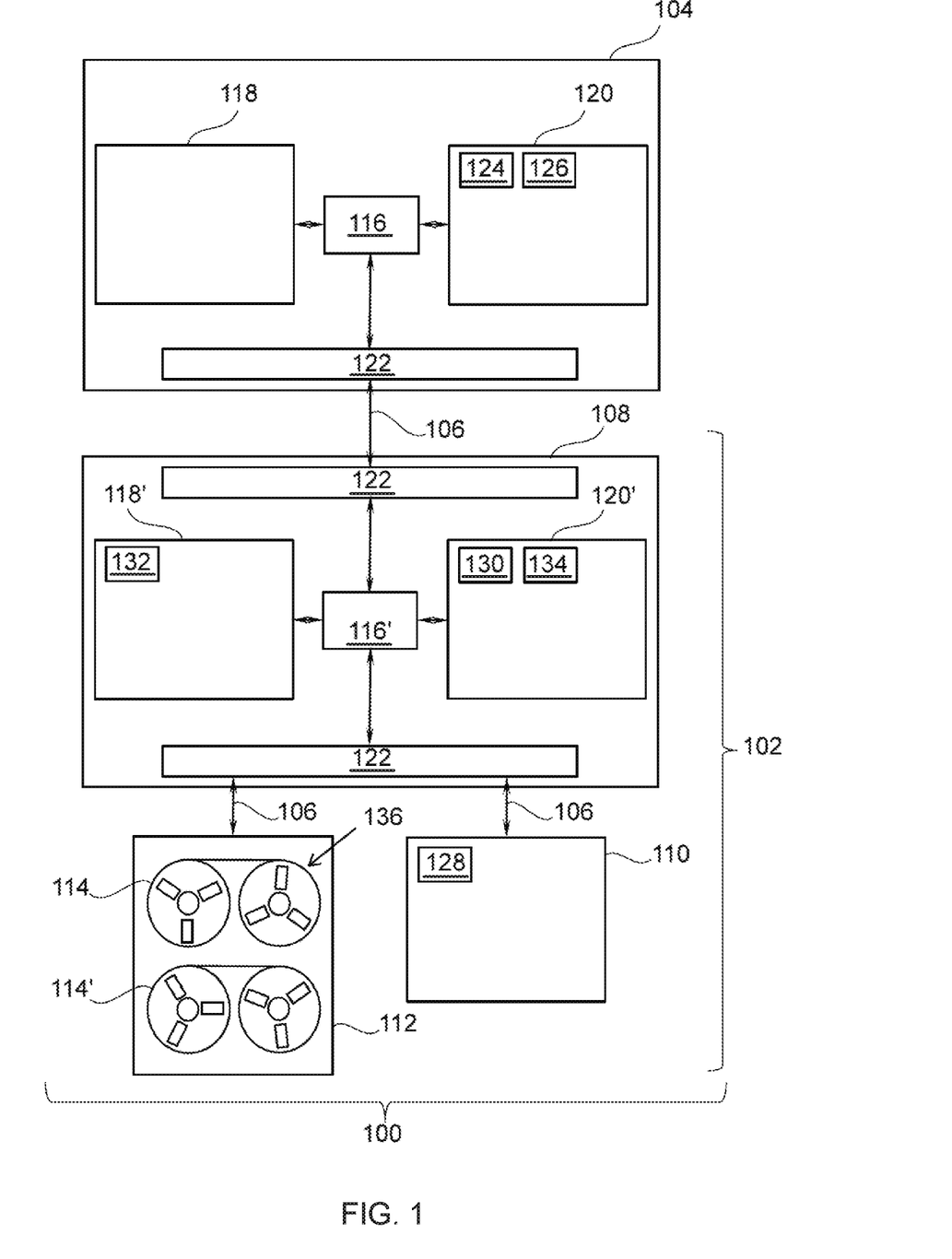
FIG. 1 depicts an example of a networked computer system, in accordance with an embodiment of the present invention.

FIG. 1 depicts an example of a networked computer system, in accordance with an embodiment of the present invention. More specifically, the networked computer system 100 comprises a storage system 102 and a host machine 104. The host machine 104 is connected to the storage system 102 by a network connection 106. In some examples the storage system 102 is a storage area system. In this example the storage system 102 comprises a server 108 that is networked to the host machine via the network connection 106. The storage system 102 further comprises a random access storage unit 110. For example, the random access storage unit 110 could be a disk array. The storage system 102 further comprises a sequential access backup system 112 which is shown as comprising a first sequential access drive 114 and a second sequential access drive 114'. The sequential access backup system 112 is, for example, a tape backup system, the first sequential access drive 114 is a tape drive, and the second sequential access drive 114' is a second tape drive.

In various embodiments, the host machine 104 is a computer and the server 108 is also a computer. The host machine 104 is shown as comprising a processor 116 that is in communication with storage 118, memory 120, and a network interface 122. The server 108 is shown as also containing a processor 116' that is in communication with storage 118, memory 120' and also has at least one network interface 122. The network interfaces 122 enable communication between the processors 116, 116' and the network connections 106. The contents of the storage 118 and the memory 120 can be duplicated or interchanged. Likewise the contents of the storage 118' may be interchanged or duplicated with the contents of the memory 120'.

The memory 120 of the host machine 104 is shown as containing hypervisor software 124. The hypervisor 124 is used for providing an environment for a virtual machine 126. The virtual machine 126 is shown as having been loaded into the memory 120 of the host machine 104.

The random access storage unit is shown as storing operating system data 128. The operating system data 128 is provided to the virtual machine 126 as it boots. It does not need to be stored in the storage 118 of the host machine 104. The memory 120' of the server 108 contains instructions 130 which enable the processor 116' to manage the operation and function of the storage system 102. For example when it receives a request via the network connection 106 for the operating system 128 the processor 116' provides it directly to the processor 116 of the host machine 104. The instructions 130 can cause the processor 116' to record a record file 132 which records the order of data that is provided from the operating system data 128. For example during booting of the virtual machine 126 the processor 116' can keep track of the order in which data is provided to the virtual machine 126 during the booting process. This can be stored in the record file 132. This can then later be used to copy sequential boot data 136 onto the sequential access drive 114. In some examples, there is an optional buffer 134 where data from the sequential access drive 114 is buffered as it is provided to the virtual machine 126.

In some examples the instructions 130 cause the processor to track the booting of the virtual machine 126 multiple times in order to track how stable the boot order of the data is. This can allow the development of statistics which describe how stable the order of data requested by the virtual machine is. This, for example, can be compared to a threshold or one or more criteria which can be used to determine if the operating system data 128 should be moved to the sequential access drive 114 or not.

Figure 2:
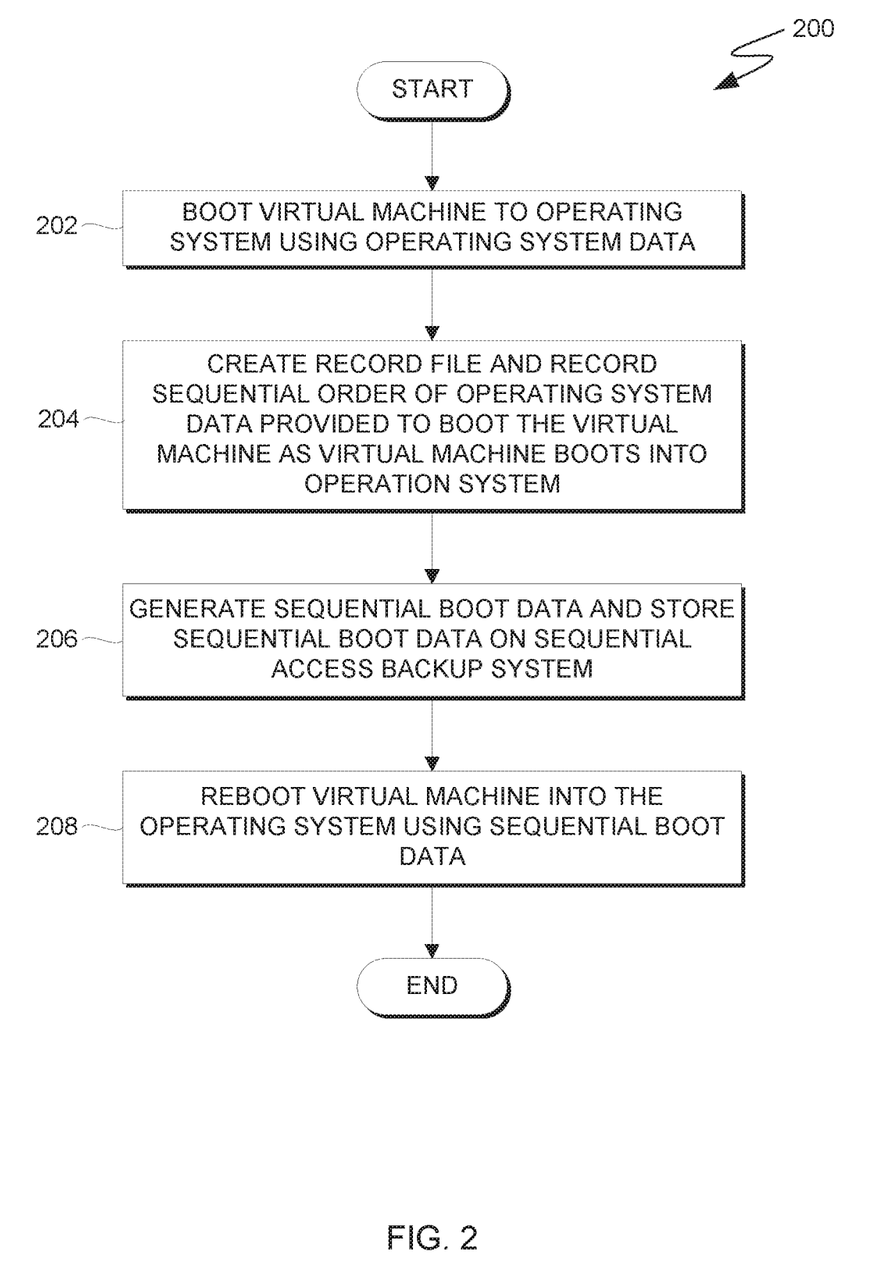
FIG. 2 depicts a flowchart that illustrates a method of operating the networked computer system of FIG. 1, in accordance with an embodiment of the present invention.

FIG. 2 depicts a flowchart that illustrates operations 200 for operating the networked computer system of FIG. 1, in accordance with an embodiment of the present invention. In step 202, the virtual machine 126 is booted to an operating system using the operating system data 128. The operating system data 128 is provided to the virtual machine 126 via the network connection 106. It should be noted that the operating system can be booted into without the storage of the operating system data 128 on the storage 118. In step 204, the record file 132 is created and the sequential order of the operating system data 128 provided to the virtual machine 126 is recorded as the operating system is booted into. In step 206 the sequential boot data 136 is created and stored on the sequential access backup system 112. The sequential boot data 136 is a copy of the operating system data 120. The data is stored in blocks on the sequential access drive 114 in an order according to the order recorded in the record file 132. In step 208, the virtual machine 126 reboots into the operating system using the sequential boot data 136. As the sequential boot data is recorded in the order that it is needed by the virtual machine 126 this can be provided by the less expensive and slower sequential access backup system 112.

As discussed below with respect to FIG. 3, Embodiments of the present invention provide an IAFT (Instant Access From Tape) system that comprises one or more computer-storage nodes. A computer-storage node may host a hypervisor used to virtualize the underlying hardware. The hypervisor may host one or more virtual machines. The computer-storage node may host a backup client whereby the backup client is connected to a backup server. The backup client may be configured to backup and restore the virtual machines comprising functions of the hypervisor (function is called "off-host backup"). The backup client may be configured to use the backup data stored on the backup server on tape to boot the virtual machine (the used operating system) without moving data to the hypervisor (function is called "instant access"). In some embodiments, the IAFT system is configured to collect access statistics data from virtual machines by using hypervisor functionality and expand the existing functionality.

Figure 3:
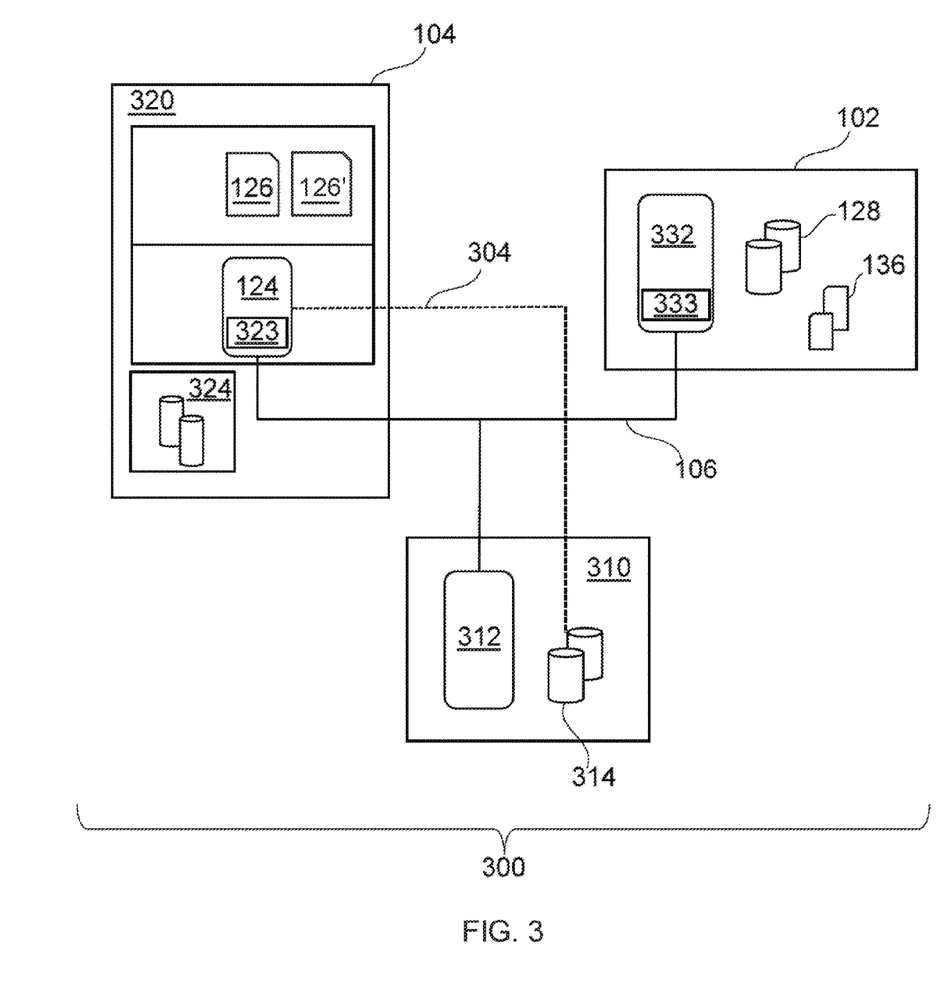
FIG. 3 depicts an Instant Access From Tape (IAFT) system, in accordance with an embodiment of the present invention.

FIG. 3 depicts an Instant Access From Tape (IAFT) system, in accordance with an embodiment of the present invention. For specifically, FIG. 3 depicts IAFT system 300 for virtual machines with OS relevant block sequence monitoring module (BSM) 323 and block sequence ordering module (BSO) 333 integrated. With those modules embodiments of the invention introduce a predictive ordering of OS relevant data blocks on tape to optimize the boot performance for instant recovery operations. IAFT system 300 may also be referred to as a networked computer system. IAFT system 300 in FIG. 3 is an alternative implementation of networked computer system 100 of FIG. 1.

The example in FIG. 3 shows a block sequence monitoring module (BSM) 323 which uses the existing change block tracking (CBT) capabilities of the hypervisor 124 to track changes on data blocks due to writes happening inside the VM 126 or 126'. The BSM 323 also includes new module to track the access of data blocks dues to reads inside the VM 126. This module is called block access tracking (BAT) module. By using CBT and BAT the BSM 323 is able to track block access and block changes on the hypervisor 124 level during the boot operation of one or multiple VMS (e.g., VMs 126 and 126'). The BSM 323 stores the accessed and changed block numbers in the order they are accessed during a boot operation in the table T1.

TABLE T1

Accessed and changed blocks in order of access during VM boot operation.

| VM ID | Block ID | AT |
|---|---|---|
| 1 | 1 | A |
| 1 | 4 | A |
| 1 | 3 | A |
| 1 | 2 | A |
| 1 | 5 | A |

The BSM 123 creates for each VM 126 a table T1 during the boot operation of that particular VM. The table T1 is stored in the same data store 324 where the VMs virtual disks are stored. The table includes the VM ID which is a unique ID to identify the VM 126 on the hypervisor 124. Furthermore the table includes a Block ID which is a unique number that specifies the accessed or changed block on the VMs virtual disk stored on the data store 324. The same block ID can appear multiple times in the table T1. The table also includes the access type (AT) which can be "A" for accessed and "C" for changed. In the example table T1 above the VM that was booted has the ID 1. The blocks are accessed in the order by block ID 1, 4, 3, 2, 5.

The table T1 is overwritten during each subsequent boot operation of the particular VM to track changes in the order of accessed blocks during a boot. This can happen due to updates of the operating system by new drivers or new components or by manual changes in the configuration by the user of the VM. Also if the same operating system and level is installed on 2 different VMs we cannot assume the same order of block access during the boot operation due to differences in the virtual hardware.

The BSM 123 maintains a table T2 which stores the block size for each VM identified by its ID. The table T2 includes the VM ID and the VMs data block size (VMBS). The table T2 is stored on the data store 324 in the virtual environment 320. The entry for a VM is stored when a VM was created in the virtual environment. After the creation of the VM the block size is static over the lifetime of the VM.

TABLE T2

The data block size for each VM

| VM ID | VMBS |
|---|---|
| 1 | 10 |
| 2 | 20 |
| 3 | 15 |

During a first backup the backup/restore program 312 running on the backup/restore datamover system 310 backs up the full virtual machines 126 by retrieving the virtual machines configuration and virtual disk stored on datastore 324 via an API provided by the hypervisor 124. The configuration and the disks of the backed up virtual machine are stored on the backup server 102 in a disk storage 136.

Backup/restore program 322 also retrieves the table T1 and table T2 from the same datastore 324 like the virtual disks for that particular VM are stored and copy them on the backup server 102. This additional step is done for each single VM backup.

The block sequence ordering module (BSO) 333 running on the backup server 102 reads the VM ID and the VM Block size (VMBS) from the table T2 and creates table T3 which stores for each Tape ID the tape block size (TBS).

TABLE T3

The tape block size for each tape cartridge

| Tape ID | TBS |
|---------|-----|
| 1 | 30 |
| 2 | 40 |
| 3 | 50 |

Tables T2 and T3 are used to calculate the required information: The table T3 includes the VMID and the VM block size (VMBS) retrieved from the table T2 and the assigned Tape ID with the corresponding block size (TBS) on that tape. Each VM is assigned from the BSO to a particular tape to avoid that the data from a VM is distributed over several tapes. The block size (TBS) on the tape is bigger as the block size of the VMs. Multiple data blocks of a VM can be stored within a block on the tape. The number of VM blocks that can be stored in a tape block can be calculated by dividing the tape block size (TBS) by the VM block size (VMBS). The resulting number is called cluster size (CLS). Each cluster that includes 1 or multiple VM blocks gets a unique cluster ID.

$$CLS=TBS/VMBS \quad \text{Expression 1:}$$

The block sequence ordering module (BSO) 333 running on the backup server 102 reads the Tape ID assigned to the processed VM backup from table T3 and reads the Block ID and access type (AT) from table T2. The table T3 is created and the Block ID is stored in the same order like in table T2. In addition each block is assigned to a cluster ID based on the calculated cluster size (CLS).

TABLE T4

The blocks in the order of the access during boot and assigned cluster ID on the tape.

| Tape ID | Block ID | Cluster ID | AT |
|---------|----------|------------|-----|
| 1 | 1 | 1 | A |
| 1 | 4 | 1 | A |
| 1 | 3 | 1 | A |
| 1 | 2 | 2 | A |
| 1 | 5 | 2 | A |

The table T4 includes the Tape ID where the VM data will be stored on, the Block ID in the order of access during the VM boot operation, the cluster ID and the access type (AT). The cluster ID is generated in sequential order and assigned to a block ID dependent from the cluster size which describes the number of VM blocks that fits into a tape block.

After the table T4 is completely filled the sequence ordering module (BSO) 333 copy the VM data blocks previously stored on disk storage 128 to the tape with the tape ID from table 4 in the order of the cluster ID from table T4.

During a subsequent backup the backup/restore program 312 running on the backup/restore datamover system 310 queries the backup server to identify if a previous backup version of the virtual machine exists. If a previous backup exists the backup/restore datamover system 310 sends all changed data blocks of the virtual machine 126 retrieved by an API provided by the hypervisor 124 to the backup server 102. The changed blocks of the virtual machine are stored on the backup server 330 in a disk storage 128. Additionally the backup/restore datamover system 310 copy the updated versions of table T1 and table T2 to the backup server 102.

The block sequences ordering module (BSO) 333 running on the backup server 102 processes the same steps like described above for the first backup with the difference that the backup server maintains table T4 as table T4a created at the time of the last backup. With the table T2 received from the backup client it creates a second temporary instance of table T4 (T4b).

TABLE T4a

The blocks in the order of the access during boot from previous backup

| Tape ID | Block ID | Cluster ID | AT |
|---------|----------|------------|-----|
| 1 | 1 | 1 | A |
| 1 | 4 | 1 | A |
| 1 | 3 | 1 | A |
| 1 | 2 | 2 | A |
| 1 | 5 | 2 | A |

TABLE T4b

The blocks in the order of the access during boot from current backup

| Tape ID | Block ID | Cluster ID | AT |
|---------|----------|------------|-----|
| 1 | 6 | 1 | A |
| 1 | 1 | 1 | A |
| 1 | 4 | 1 | A |
| 1 | 3 | 2 | A |
| 1 | 2 | 2 | A |
| 1 | 5 | 2 | A |

The table T4b shows the situation after the current backup where a new block was accessed at the beginning of the boot operation (Block ID: 6). The block sequences ordering module (BSO) 333 running on the backup server 102 compares the content of table T4a with the content of table T4b, row by row, and calculates the differences at a cluster level.

TABLE T5

Track if data needs to be written to tape again

| Tape ID | Cluster ID | Update |
|---------|------------|--------|
| 1 | 1 | Yes |
| 1 | 2 | Yes |
| 1 | 3 | No |

If a new block is identified by the Block ID in the given block cluster identified by the Cluster ID in Table T4b compared to table T4a, the Update column is modified to "yes" in table T5 for the tape with current Tape ID and current Cluster ID.

If a deleted block is identified by the Block ID in the given block cluster identified by the Cluster ID in Table T4b compared to table T4a, the Update column is modified to "yes" in table T5 for the tape with current Tape ID and current Cluster ID.

If a sequence of blocks is identified by the Block ID changed in the given block cluster identified by the Cluster ID compared to table T4a, the Update column is modified to "no" in table T5 for the tape with current Tape ID and current Cluster ID.

If an access type (AT) has changed from "A" (accessed) to "C" (changed) in table T4b compared to table T4a, which implies a block content change, the Update column is modified to "yes" in table T5 for the tape with current Tape ID and current Cluster ID.

The table T5 stores for each cluster if an update of the block is necessary. Furthermore, the block sequences ordering module (BSO) 333 running on the backup server 102 maintains table T6 that contains information about the block cluster and a block cluster change count. For each block cluster identified by the Cluster ID in table T6 change identified in the previous step the change count may be increased.

TABLE T6

Used to get change count thresholds to move block to disk if needed.

| Tape ID | Cluster ID | Change Count |
| --- | --- | --- |
| 1 | 1 | 2 |
| 1 | 2 | 1 |
| 1 | 3 | 3 |
| 1 | 4 | 1 |
| 1 | 5 | 8 |

The block sequences ordering module (BSO) 333 running on the backup server 102 reads the table T5 for a certain tape, and if in the column "Update" a "yes" occurs just once, the backup server reads the block clusters of the previous backup data from tape storage 136. The cluster blocks identified by the Cluster ID which need an update are replaced with the new block data from the current backup. The block clusters that reach a defined threshold of change count in table T6 will be removed from the data stream. The backup server 102 writes the new block cluster sequence to tape storage 136. All block clusters removed from the stream because of the threshold for change count reached remain on disk storage 136.

The block sequences ordering module (BSO) 133 running on the backup server 130 maintains a table T7 that contains information about the tape identified by the Tape ID and the virtual machines identified by the VMID. This information is used to correlate virtual machines and tapes.

TABLE T7

Used to get correlation between tape and VM

| Tape ID | VMID |
| --- | --- |
| 1 | 1 |
| 1 | 2 |
| 2 | 3 |
| 3 | 3 |
| 4 | 3 |

The table T7 is used by the block sequences ordering module (BSO) 333 running on the backup server 102 in case of a the block clusters belonging to one virtual machine do not fit onto one tape cartridge. In that case the block clusters are spread over two or more tapes. The information on which tape identified by the Tape ID the data blocks of a VM identified by the VMID are stored is contained in table T7. The first tape cartridge used for a given virtual machine contains the operating system boot sequence like described above. In the example table T7 the data blocks of VM 1 are stored on tape 1 and the data blocks of VM 2 are stored on tape 1 also. The data blocks of VM 3 are stored on tape 2, 3, and 4 and the first tape cartridge contains the OS boot information.

The data blocks belonging to a virtual machine disk and the virtual machine configuration stored on the backup server 102 during a backup can be used to implement an instant access for virtual machines. Therefore the backup/restore program 312 running on the backup/restore datamover system 310 exposes the virtual machines 126 disk as iSCSI targets 314 to the hypervisor 124 via a iSCSI network 304. Therefore block sequences ordering module (BSO) 133 running on the backup server 130 traverses table T7 to identify the tape cartridge. The cartridge is mounted and spooled to offset position of first block cluster for that virtual machine. The backup/restore program 312 furthermore creates a new virtual machine on the virtual environment 320 based on the configuration of the original virtual machine which was stored on the backup server 102 during the backup operation. The backup/restore program 312 attaches the exposed iSCSI targets 314 as iSCSI disks to the new virtual machine 126'. The backup/restore program 312 initiates a power on of the new virtual machine via the hypervisor 124 which leads to a boot operation of the operation system running in the new virtual machine 126'. The required data blocks during the boot operation are retrieved by the backup/restore program 312 from the backup server 102 on demand and stored in the iSCSI disks 314 which are attached to the new virtual machine 126'. The retrieved data blocks are read by the backup server 102 in sequential order of the block clusters from tape. Because the data blocks where stored by the system in the order like required during the boot operation the operating system running in the virtual machine gets the data fast enough to avoid time out situations.

In some embodiments, the IAFT system is configured to calculate block sequences required for operating system boot operations based on the collected statistics information. Various embodiments of the IAFT system implement hardware and/or software to perform one or more of the following operations: (i) maintain a table T1 that contains information about the protected virtual machine (VM ID), the protected block (Block ID) and the access type (AT=(Access|Change)) to the block; (ii) order the entries in the table T1 by block access sequence whereby row 0 represents the first block that was accessed at operating system boot time and row N represents the last block that was accessed at operating system boot time; (iii) maintain a table T2 that contains information about the protected virtual machine; (iv) maintain a table T2 that contains information about the protected virtual machine (VM ID) and the virtual machine specific block sizes (VMBS); and (v) use hypervisor functionality to collect pairs VM ID, VMBS for each protected virtual machine.

In some embodiments, the IAFT system is configured to monitor the block access at the time of a boot of a virtual machine and store them to be used for backup operations. Various embodiments of the IAFT system implement hardware and/or software to perform one or more of the following operations: (i) enable access block monitoring of a given virtual machine; (ii) use the block access and block change tracking methods described above to catch block depending operations at the time of the boot operation of the virtual machine; (iii) use the table T1 described above to store the collected block specific information and the sequences where the blocks were accessed for backup operations; and (iv) use table T2 to store virtual machine specific block size information.

In some embodiments, the IAFT system is configured to monitor the block change at the runtime of the virtual machine and store them to be used for backup operations. Various embodiments of the IAFT system implement hardware and/or software to perform one or more of the following operations: (i) enable change block monitoring of a given virtual machine, (ii) use the block access and block change tracking methods described above to catch block depending operations at the time of the boot operation of the virtual machine; and (iii) use the table T1 described above to store the collected block specific information and the sequences where the blocks were accessed for backup operations.

In some embodiments, the IAFT system is configured to use calculated block sequences to calculate block sequence clusters to store them on sequential access media types like tape. Various embodiments of the IAFT system implement hardware and/or software to perform one or more of the following operations: (i) maintain table T3 that contains information to identify instances of the sequential access media type (Tape ID) and the characteristic block size used for the medium (TBS); (ii) traverse table T2 to read the block size (VMBS) for a given virtual machine (VM ID); and (iii) calculate the cluster size (CLS) by dividing the TBS by the VMBS where CLS is the number of VMBS that can be written or read from or to a tape performing one I/O operation.

In some embodiments, the IAFT system is configured to incrementally backup a virtual machine off-host and use the calculated block sequence and block clustering information to store the backup data on the backup server in the order needed for operating system boot sequences (this includes changes to the block sequences and block clusters). Various embodiments of the IAFT system implement hardware and/or software to perform one or more of the following operations described below to incrementally backup a virtual machine off-host and store the backup data on the backup server in the order needed for operating system boot sequences.

In some embodiments, IAFT system initiates the backup of a given virtual machine and queries the backup server to identify if a previous backup version of the virtual machine exists. If no backup exists, the IAFT system implements hardware and/or software to perform one or more of the following operations: (i) send all data blocks to the backup server that are entered in table T1 to the backup server, (ii) start from row 0 and traverse the table from top down, and (iii) send the blocks identified by the entered block ids Block ID in this sequence to the backup server. If a previous backup exists, the IAFT system implements hardware and/or software to perform one or more of the following operations: (i) send all data blocks to the backup server that have a change tracked (AT=C) in table T1 to the backup server; (ii) start from the first matching row and traverse the table from top down; (iii) send the blocks identified by the entered block ids Block ID in this sequence to the backup server, and (iv) send the Block ID to the backup server for each block in the table T1 that had no change (AT=A).

In some embodiments, the backup server receives all blocks sent from the backup client ordered in the boot sequence order. If the block had changed in the virtual machine since last backup it will receive the data. If the block didn't change since the last backup it receives the Block ID only to be able to reconstruct the boot sequence ordering.

In some embodiments, the backup server maintains table T4 (T4a) created at the time of the last backup. Table T4 contains information about the tape instance used Tape ID, the block stored at the place on the media Block ID, the cluster where the block belongs to Cluster ID and the access type recorded at the time of the last backup AT. If this is the first backup of the given virtual machine the table T4a is empty. With the block sequences received from the backup client it creates a second temporary instance of table T4 (T4b). The backup server compares the content of table T4a with the content of table T4b and calculates the differences. Various embodiments of the IAFT system implement hardware and/or software to perform one or more of the following operations: (i) if a new block is identified by the Block ID in the given block cluster identified by the Cluster ID in Table T4b compared to table T4a, modify Update column to "yes" in table T5 for the tape with current Tape ID and current Cluster ID; (ii) if a deleted block is identified by the Block ID in the given block cluster identified by the Cluster ID in Table T4b compared to table T4a, modify Update column to "yes" in table T5 for the tape with current Tape ID and current Cluster ID; (iii) if a sequence of blocks identified by the Block ID changed in the given block cluster identified by the Cluster ID compared to table T4a, modify Update column to "no" in table T5 for the tape with current Tape ID and current Cluster ID; (iv) if an access type (AT) has changed from "A" (accessed) to "C" (changed) in table T4b compared to table T4a which implies a block content change, modify Update column to "yes" in table T5 for the tape with current Tape ID and current Cluster ID.

In some embodiments, the IAFT system implements hardware and/or software such that: (i) the backup server maintains table T6 that contains information about the block cluster (Cluster ID) and a block cluster change count (CC); (ii) for each block cluster changed in the previous step the change count will be increased; (iii) the backup server reads the block clusters of the previous backup data from tape; (iv) the backup server replaces the changed block clusters with the new block data; (v) lock clusters that reach a defined threshold of change count in table T6 will be removed from the data stream; (vi) the backup server writes the new block cluster sequence to tape; (vii) the backup server writes all block clusters removed from the stream because of the threshold for change count reached to disk.

In some embodiments, the backup server maintains table T7 that contains information about the tape (Tape ID) and the virtual machines (VM ID). This information is used to correlate virtual machines and tapes.

In some embodiments, the IAFT system is configured to calculate block sequence and block cluster change statistics that are used to define whether a block sequence or a block cluster can reside on sequential access media types like tape or should be moved to random access media types like SSD or HDD, as discussed with table T6 above.

In some embodiments, the IAFT system is configured to provide instant access to a previously backed up virtual machine by reading the data required for the boot sequence from sequential access media types like tape. The IAFT system implements hardware and/or software to perform one or more of the following operations to read the data required for the boot sequence from sequential access media: (i) the instant access module receives a VM ID and task to make it available for instant access; (ii) the instant access module traverses table T7 to identify the tape cartridge and then mounts and spools the cartridge to offset position of first block cluster; (iii) a tape cartridge is made available for remote access (see iSCSI description); (iv) instantiate new virtual machine by using hypervisor functions; (v) initiating boot of the virtual machine by reading data from tape.

In some embodiments, the IAFT system is configured to restore a virtual machine from backup data whereby the data is read from sequential access media types like tape. The IAFT system implements hardware and/or software to perform one or more of the following operations to restore a virtual machine from backup data: (i) make virtual machine available via instant access as described above and (ii) allow read access to the running virtual machine to restore user data from the virtual machine started from tape backup to the production system by copying the data over network.

In some embodiments, the IAFT system is configured to distribute the backup data of a virtual machine over two or more media entities (tape cartridges) in the order required for the operating system boot sequence. To distribute the backup data of a virtual machine, the block clusters belonging to one virtual machine can be spread over one or more tape cartridge. Table T7 is used to store this information. The first tape cartridge used for a given virtual machine can contain the operating system boot sequence.

In some embodiments, a method of operating a networked computer system is provided. The networked computer system includes a host machine. The host machine hosts a hypervisor for running at least one virtual machine. The hypervisor can also refer to a virtual machine monitor or VMM. A hypervisor may be considered a piece of computer software or firmware in combination with hardware that creates and runs virtual machines. The networked computer system further includes a storage system. The storage system includes a random access storage unit for storing operating system data for the at least one virtual machine. The operating system provides data for booting into an operating system. The operating system data is stored in the random access storage unit as first blocks. A block can encompass a physical record or storage of computer data. It can be a sequence of bits or bytes which have a particular block size.

In some embodiments, the networked computer system further includes a sequential access backup system. The sequential access backup system is configured for storing data in second blocks. The second blocks has a second block size. The networked computer system further includes a network connection between the host machine and the storage system. The network connection can also be between the host machine and the sequential access backup system and/or the storage system. The network connection in different embodiments can have different topologies. In one embodiment the host machine is connected to the storage system via a network connection and there is an additional connection between the storage system and the sequential access backup system. In other embodiments the host machine, the storage system, and the sequential access backup system are all connected together on the same network connection.

In some embodiments, the method comprises rebooting the at least one virtual machine into the operating system using the sequential boot data. This feature advantageously enables booting the at least one virtual machine using a sequential access backup system.

In some embodiments, the at least one virtual machine makes data requests from the storage system sequentially for the operating system data during re-booting into the operating system. The storage system provides the sequential boot data from the sequential access backup system to the at least one virtual machine in response to the data requests. The storage system advantageously provides the operating system data in a manner from the sequential access backup system so that the at least one virtual machine can be booted into the operating system. Providing the operating system data from the random access storage unit or the potentially less expensive sequential access backup system may be transparent to the user. This feature may advantageously provide a savings in the amount of space and/or energy used by the random access storage unit.

In some embodiments, the booting of the at least one virtual machine into the operating system using the operating system data and the recording of the record file in a sequential order is performed multiple times. Accordingly, the sequential order of the boot data access is recorded multiple times. The method further comprises calculating booting statistics from the record file. In this example the record file contains the order in which the operating system accessed data multiple times. The sequential order of the operating system data from multiple boots of the operating system can therefore be compared and can be analyzed for stability. The method further comprises recording the sequential boot data on the sequential access backup system if the booting statistics meets a pre-determined criteria. If, for example, the sequential order of the boot data is the same or sufficiently similar between boots, then it is advantageous to record the sequential boot data on the sequential access backup system. For example, some embodiments of the present invention calculate a statistical measure that indicates often the hypervisor needs to wait until the proper block of data is provided. If the wait is below a predetermined threshold, then the recording of the sequential boot data on the sequential access backup system can be commenced. If not, then it is advantageous to leave the operating system data on the random access storage unit.

In some embodiments, the method further comprises comparing the order of the sequential boot data to the data requests during rebooting of the operating system. This is advantageous because comparing the order of the sequential boot data and the data request during rebooting are done at the same time. As the data requests for the rebooting are already being done for the booting into the operating system they do not need to be accessed a second time. This feature advantageously saves an amount of processor time and/or energy to perform the comparison.

In some embodiments, the method further comprises buffering the sequential boot data if the data requests are out of order from the sequential boot data. This feature is advantageous if the virtual machine requests data out of order from the way the data is stored on the sequential access backup system but not such that the boot into the operating system will fail. In some instances the operating system may boot more slowly but the booting process will not fail.

In some embodiments, the method further comprises updating the record file if the requests are out of order from the sequential boot data. This feature advantageously provides a way to correct the order in which the blocks are stored on the sequential access media.

In some embodiments, the method further comprises re-recording the sequential boot data according to the updated record file if the requests are out of order from the sequential boot data. This feature advantageously provides an improved sequential boot data that enables the operating system to be booted more rapidly.

In some embodiments, the method further comprises terminating the re-recording of the sequential boot data if changes in the updated record file result in changes in only how data is ordered within the second blocks. In sequential data systems such storage systems such as a tape backup the data is stored and retrieved in blocks. If data within a particular block is out of order it will not affect the amount of time which it takes to access the data and provide it to the system. In this case, it would then not be necessary to re-record the sequential boot data.

In some embodiments, the method further comprises buffering the sequential boot data if the data requests are out of order from the sequential boot data and terminating the re-recording of the sequential boot data if the buffering is below a predetermined amount. If, for example, the number of times that the data is buffered, or if the delay in which data is provided to the at least one virtual machine, is below a predetermined threshold then it is not be necessary to re-record the sequential boot data.

In some embodiments, the sequential access backup system comprises a first sequential access media and a second sequential access media. The sequential boot data is stored on the first sequential access media and the sequential boot data is re-recorded onto the second sequential access media. This feature advantageously eliminates the need to copy the data from the first sequential access media to a random access storage unit and then back to the second sequential access media.

In some embodiments, the sequential access backup system is a tape backup system. In other embodiments the sequential access backup system is any one of the following: a blu-ray disk system, an optical disk system, a DVD disk system, a CD disk system, a sequential hard drive system, and a drum memory system.

In some embodiments, the first sequential access media is a first tape, and the second sequential access medial is a second tape. In other embodiments, the first sequential access media is any one of the following: a first tape, a first blu-ray media, a first optical disk media, a DVD disk media, a CD disk media, a first sequential hard drive, and a first drum memory. In various embodiments, the second sequential access media is any one of the following: a second tape, a second blu-ray media, a second optical disk media, a second DVD disk media, a second CD disk media, a second sequential hard drive, and second drum memory.

In some embodiments, the re-recording of the sequential boot data is performed concurrently to the rebooting of the at least one virtual machine from the sequential boot data onto the first sequential access media. This feature can also include re-recording the data onto the second sequential access media as it is provided to the hypervisor which is running the at least one virtual machine. The data is advantageously loaded and provided to the virtual machine and it is then automatically re-recorded in the correct order onto the second sequential access media.

In some embodiments, the rebooting of the at least one virtual machine into the operating system using the sequential boot data is performed without storing the sequential boot data on the host machine. This feature advantageously reduces the amount of resources needed by the host machine.

In some embodiments, application data of the at least one virtual machine is stored on the random access storage unit. The method further comprises retrieving the application data from the random access storage unit after rebooting the at least one virtual machine.

In some embodiments, the method further comprises retrieving or providing application data after rebooting the at least one virtual machine. This feature advantageously provides the application data separately from the operating system.

In some embodiments, the storage system is communicatively connected to the host machine via a storage area network.

In some embodiments, the sequential backup system is communicatively connected to the storage system and/or the host machine via a storage area network. This feature advantageously provides the operating system data in a transparent manner to the host machine.

In some embodiments, the random access storage unit is a disk drive or a disk array.

In some embodiments, the steps of booting the at least one virtual machine into the operating system using the operating system data and recording the record file in sequential order are performed multiple times before recording sequential boot data on the sequential access backup system. This feature advantageously ensures that the data is recorded in the proper order on the sequential access backup system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for backing up virtual machine operating system data on sequential-access data storage systems, the method comprising:

booting on a host machine, by one or more computer processors, at least one virtual machine running on a hypervisor into an operating system using operating system data, wherein the operating system data is provided to the at least one virtual machine from a random access storage unit of a storage system that is communicatively connected to the host machine, and wherein the random access storage unit stores the operating system data as a first plurality of blocks;

recording in a sequential order, by one or more computer processors, the operating system data provided to the at least one virtual machine as the operating system is booted into, wherein the operating system data is recorded in a record file; and determining, by one or more computer processors, that a threshold booting statistic indicates that the sequential order of the operating system data is stable, and in response, recording, by one or more computer processors, sequential boot data on one or more sequential access media of a sequential access backup system, the sequential boot data obtained, at least in part, from the record file and representing, at least in part, a copy of the operating system data as a second plurality of blocks based, at least in part, on the sequential order of the operating system data provided to the at least one virtual machine, wherein (i) the record file includes data representing multiple instances of booting the at least one virtual machine, (ii) the threshold booting statistic is derived from the data included in the record file, and (iii) the sequential access backup system is communicatively connected to the storage system.

2. The method of claim 1, the method further comprising:
determining, by one or more computer processors, that the threshold booting statistic indicates that the sequential order of the operating system is not stable, and in response, re-booting a virtual machine of the at least one virtual machine using the operating system data in the first plurality of blocks of the random access storage unit.

3. The method of claim 1, the method further comprising:
re-booting, by one or more computer processors, the at least one virtual machine into the operating system using the sequential boot data.

4. The method of claim 3, the method further comprising:
the storage system identifying, by one or more computer processors, a plurality of sequential requests from the at least one virtual machine for respective portions of the operating system data in order to re-boot, and in response the storage system providing, by one or more computer processors, the sequential boot data to the at least one virtual machine based, at least in part, on the plurality of sequential requests.

5. The method of claim 4, the method further comprising:
comparing, by one or more computer processors, an order of the second plurality of blocks of the sequential boot data to an order of the plurality of sequential requests from the at least one virtual machine.

6. The method of claim 5, the method further comprising:
determining, by one or more computer processors, that the order of the second plurality of blocks of the sequential boot data is different than the order of the plurality of sequential requests from the at least one virtual machine, and in response, buffering, at least in part, the sequential boot data.

7. The method of claim 5, the method further comprising:
determining, by one or more computer processors, that the order of the second plurality of blocks of the sequential boot data is different than the order of the plurality of sequential requests from the at least one virtual machine, and in response, updating the record file based, at least in part, on the order of the plurality of sequential requests from the at least one virtual machine.

8. The method of claim 7, the method further comprising:
re-recording, by one or more computer processors, the sequential boot data based, at least in part, on the updated record file.

9. The method of claim 8, the method further comprising:
determining, by one or more computer processors, that changes in the updated record file represent changes in data order only within one or more blocks of the second plurality of blocks, and in response, terminating, by one or more computer processors, the re-recording of the sequential boot data.

10. The method of claim 8, the method further comprising:
determining, by one or more computer processors, that a count representing instances of buffering, at least in part, the sequential boot data is below a threshold count, and in response, terminating, by one or more computer processors, the re-recording of the sequential boot data.

11. The method of claim 8, wherein:
recording on the sequential access backup system, by one or more computer processors, the sequential boot data comprises recording, by one or more computer processors, the sequential boot data on a first sequential access media; and
re-recording, by one or more computer processors, the sequential boot data comprises re-recording, by one or more computer processors, the sequential boot data on a second sequential access media.

12. The method of claim 11, wherein:
re-booting, by one or more computer processors, the at least one virtual machine into the operating system using the sequential boot data comprises accessing, by one or more computer processors, the sequential boot data on the first sequential boot data; and
re-recording, by one or more computer processors, the sequential boot data on the second sequential access media is performed concurrently with re-booting, by one or more computer processors, the at least one virtual machine into the operating system.

13. The method of claim 3, wherein re-booting, by one or more computer processors, the at least one virtual machine into the operating system using the sequential boot data is performed without storing the sequential boot data on the host machine.

14. The method of claim 13, the method further comprising:
retrieving, by one or more computer processors, application data from the random access storage unit subsequent to re-booting, by one or more computer processors, the at least one virtual machine into the operating system using the sequential boot data.

15. The method of claim 1, wherein a storage area network communicatively connects the host machine, the storage system, and the sequential access backup system.

16. The method of claim 1, wherein the sequential access backup system includes one or more tape drives.

17. The method of claim 1, wherein the sequential access backup system includes one or more optical disc drives.

18. The method of claim 17, wherein the random access storage unit includes one or more hard disk drives.

19. A computer program product for backing up virtual machine operating system data on sequential-access data storage systems, the computer program product comprising:
a computer readable storage medium and program instructions stored on the computer readable storage medium, the program instructions comprising:
program instructions to boot, on a host machine, at least one virtual machine running on a hypervisor into an operating system using operating system data, wherein the operating system data is provided to the at least one virtual machine from a random access storage unit of a storage system that is communicatively connected to the host machine, and wherein the random access storage unit stores the operating system data as a first plurality of blocks;
program instructions to record, in a sequential order, the operating system data provided to the at least one virtual machine as the operating system is booted into, wherein the operating system data is recorded in a record file; and
program instruction to, in response to determining that a threshold booting statistic indicates that the sequential order of the operating system data is stable, record sequential boot data on one or more sequential access media of a sequential access backup system, the sequential boot data obtained, at least in part, from the record file and representing, at least in part, a copy of the operating system data as a second plurality of blocks based, at least in part, on the sequential order of the operating system data provided to the at least one virtual machine, wherein (i) the record file includes data representing multiple instances of booting the at least one virtual machine, (ii) the threshold booting statistic is derived from the data included in the record file, and (iii) the sequential access backup system is communicatively connected to the storage system.

20. A computer system for backing up virtual machine operating system data on sequential-access data storage systems, the computer system comprising:
one or more computer processors;
one or more computer readable storage media;
program instructions stored on the one or more computer readable storage media for execution by at least one of the one or more processors, the program instructions comprising:
program instructions to boot, on a host machine, at least one virtual machine running on a hypervisor into an operating system using operating system data, wherein the operating system data is provided to the at least one virtual machine from a random access storage unit of a storage system that is communicatively connected to the host machine, and wherein the random access storage unit stores the operating system data as a first plurality of blocks;
program instructions to record, in a sequential order, the operating system data provided to the at least one virtual machine as the operating system is booted into, wherein the operating system data is recorded in a record file; and
program instruction to, in response to determining that a threshold booting statistic indicates that the sequential order of the operating system data is stable, record sequential boot data on one or more sequential access media of a sequential access backup system, the sequential boot data obtained, at least in part, from the record file and representing, at least in part, a copy of the operating system data as a second plurality of blocks based, at least in part, on the sequential order of the operating system data provided to the at least one virtual machine, wherein (i) the record file includes data representing multiple instances of booting the at least one virtual machine, (ii) the threshold booting statistic is derived from the data included in the record file, and (iii) the sequential access backup system is communicatively connected to the storage system.

* * * * *